United States Patent
Sachdev et al.

(10) Patent No.: US 10,291,504 B2
(45) Date of Patent: May 14, 2019

(54) MONITORING PERFORMANCE OF A COMPUTER SYSTEM

(71) Applicant: Microsoft Technology Licensing, LLC, Redmond, WA (US)

(72) Inventors: Sanjay Sachdev, San Jose, CA (US); Alexander Easton, San Jose, CA (US); Sean Peng, Richmond (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 226 days.

(21) Appl. No.: 15/195,062

(22) Filed: Jun. 28, 2016

(65) Prior Publication Data

US 2017/0373960 A1    Dec. 28, 2017

(51) Int. Cl.
*H04L 12/26* (2006.01)
*H04L 12/24* (2006.01)

(52) U.S. Cl.
CPC ............ *H04L 43/10* (2013.01); *H04L 41/142* (2013.01); *H04L 43/08* (2013.01); *H04L 43/16* (2013.01); *H04L 41/0681* (2013.01)

(58) Field of Classification Search
CPC ....... H04L 43/10; H04L 67/42; H04L 41/142; H04L 43/16; H04L 43/0876
See application file for complete search history.

(56) References Cited

U.S. PATENT DOCUMENTS

| 9,767,158 B1* | 9/2017 | Lewis ................. G06F 17/3053 |
| 2014/0108070 A1* | 4/2014 | Vernitsky ............ G06Q 10/025 705/6 |
| 2015/0161257 A1* | 6/2015 | Shivaswamy ..... G06F 17/30864 707/709 |
| 2016/0036716 A1* | 2/2016 | Pal ........................ H04L 69/329 709/207 |
| 2016/0036903 A1* | 2/2016 | Pal ...................... H04L 67/1004 709/213 |
| 2017/0085447 A1* | 3/2017 | Chen ................. G06F 17/30554 |

* cited by examiner

*Primary Examiner* — Philip J Chea
*Assistant Examiner* — Mohammed Ahmed
(74) *Attorney, Agent, or Firm* — Hickman Palermo Becker Bingham LLP; Daniel D. Ledesma

(57) ABSTRACT

Techniques for monitoring performance of a computer system are provided. Bucket data is stored that indicates that multiple buckets are associated with a particular type of request. Then, multiple requests are received, where a first request and a second request indicate the same type of request. Based on the bucket data, the first request is assigned to a first bucket and the second request is assigned to a second bucket. The assignment may be further based on a complexity determined for each request. First performance data is generated while processing the first request and is aggregated with second performance data that was generated while processing one or more third requests that are assigned to the first bucket. Third performance data is generated while processing the second request and aggregated with fourth performance data that was generated while processing one or more fourth requests that are assigned to the second bucket.

18 Claims, 6 Drawing Sheets

MONITORING PERFORMANCE OF A COMPUTER SYSTEM

TECHNICAL FIELD

The present disclosure relates to tracking performance of a computer system while processing requests.

BACKGROUND

Performance of a computer system that processes requests from client devices may change abruptly, especially if the computer system experiences irregular traffic. Performance changes may be attributable to changes in workload, changes in configuration, software updates, etc. If performance of a computer system that performs many tasks, experiences irregular traffic, and has many hardware or software components declines, then it may be difficult to not only identify the source of the problem, but also determine whether the problem is one that originates with the computer system or just a result of normal operating conditions. If it is presumed that the computer system is suffering from an internal problem that does not exist or is low priority, then much valuable time and effort may be wasted searching for a solution. It would be helpful, for example, to determine that a decrease in system performance is due to a change in workload (which might not require immediate attention) rather than in a poorly-designed software program, which might require immediate attention. As another example, if only a few requests are negatively impacted by a system issue, then such an issue may not need to be immediately identified and addressed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for monitoring performance of a computer system are provided. Client requests that the computer system processes are assigned to buckets, each bucket corresponding to a complexity level and is associated with an expected performance level. Different requests of the same type may be assigned to different buckets. If actual performance of the computer system with respect to a particular bucket exceeds the corresponding expected performance level, then an alert may be generated and subsequent requests that are associated with the complexity level of the particular bucket may be blocked, throttled, or handled in a different way.

Example System

Figure 1:
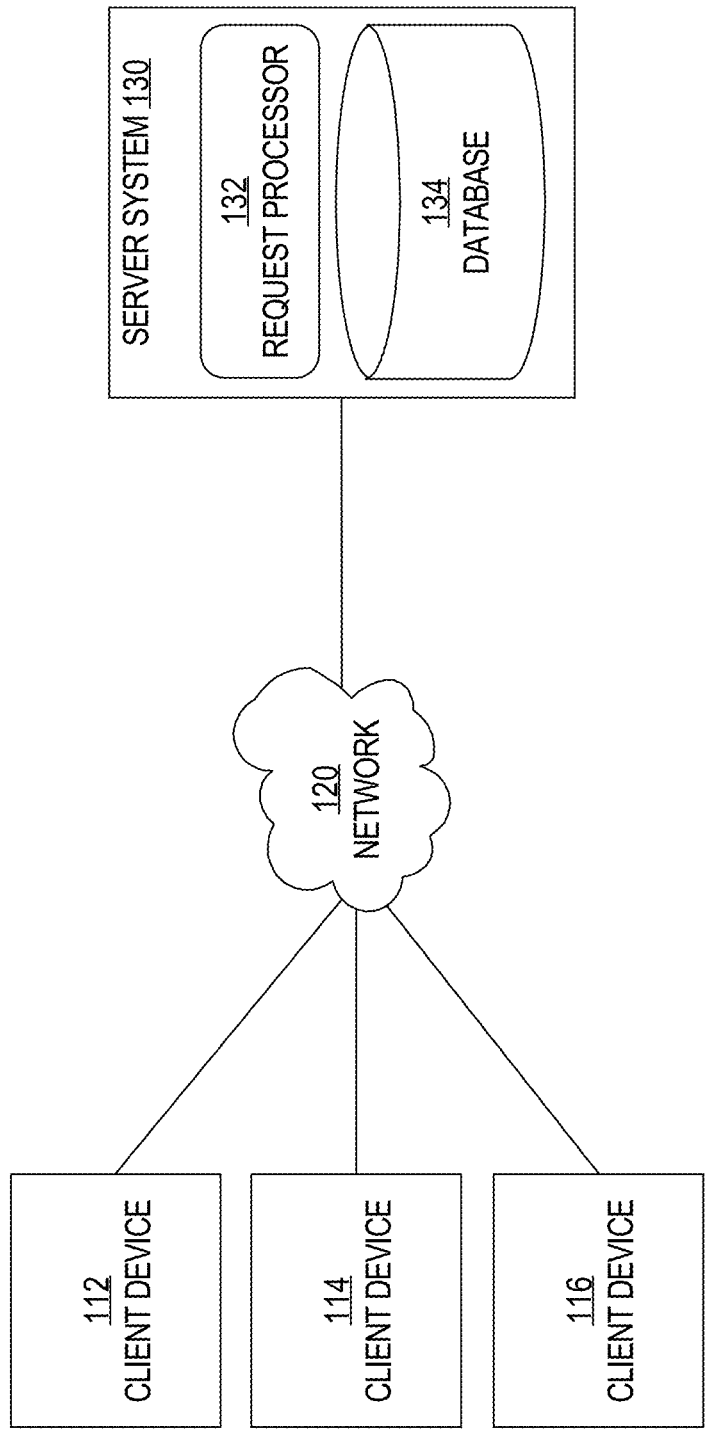
FIG. 1 is a block diagram that depicts a system for responding to requests from multiple client devices, in an embodiment.

FIG. 1 is a block diagram that depicts a system 100 for responding to requests from multiple client devices, in an embodiment. System 100 includes client devices 112-116, network 120, and server system 130.

Client devices 112-116 are computing devices that are configured to communicate with server system 130 over network 120. Examples of computing devices include a laptop computer, a tablet computer, a smartphone, a desktop computer, and a personal digital assistant (PDA). Through a client device, a user is able to submit data and/or requests to server system 130.

Each of client devices 112-116 may execute an application, such as a dedicated application that is installed on the client device and that is configured to communicate with server system 130 over network 120. Another example of an application is a web application that is downloaded from server system 130 and that executes within a web browser running on a computing device. The applications may be implemented in hardware, software, or a combination of hardware and software. Although three client devices are depicted, system 100 may include many more clients that interact with server system 130 over network 120.

Network 120 may be implemented on any medium or mechanism that provides for the exchange of data between client devices 112-116 and server system 130. Examples of network 120 include, without limitation, a network such as a Local Area Network (LAN), Wide Area Network (WAN), Ethernet or the Internet, or one or more terrestrial, satellite or wireless links.

Server System

Although depicted as a single element, server system 130 may comprise multiple computing elements and devices, connected in a local network or distributed regionally or globally across many networks, such as the Internet. Thus, server system 130 may comprise multiple computing elements other than request processor 132 and database 134. Request processor 132 receives and processes requests submitted by client devices 112-116 and sends responses (if applicable) generated based on the requests. Request processor 132 may be implemented in software, hardware, firmware, or any combination thereof.

Database 134 comprises searchable data that client devices 112-116 may access. Database 134 may be stored on one or more storage devices (persistent and/or volatile) that may reside within the same local network as server system 130 and/or in a network that is remote relative to server system. Thus, although depicted as being included in server system 130, each storage device may be either (a) part of server system 130 or (b) accessed by server system 130 over a local network, a wide area network, or the Internet.

Embodiments are not limited to the type of data that database 134 stores or the type of requests that client devices 112-116 might submit. For example, database 134 may include information about multiple content delivery campaigns, where each campaign is associated with a single party or entity that provides the campaign (or "campaign provider"). An example of such content is advertisements and an example of a campaign provider is an advertiser. An individual representing a campaign provider and operating client device 112 may submit one or more requests for information about content delivery campaigns that are being managed by server system 130, such as how the content delivery campaigns are performing, which ones are still active. If the campaign provider created hundreds of content delivery campaigns with server system 130, then it may take a significant amount of time for request processor 132 to fully respond to the request(s).

Buckets

A bucket is a logical entity with which one or more requests may be assigned. A bucket is associated with a complexity and an expected performance level. Thus, some buckets are associated with higher complexity than other buckets. Complexity refers to how complex a request is and may be measured in different ways. Examples of complexity measures include the amount of data that is returned, the number of entities (e.g., accounts or content delivery campaigns) that are processed or identified while processing a request, and the number of query parameters in a request. As another example, the type of data that is being processed may be a complexity measure. As a specific example, when processing a forecasting request, targeting a geography (one type of data) may be considered less complex than targeting a skill set (another type of data). A forecasting request is one that requests a prediction for what might happen for a particular content delivery campaign (or set of campaigns) based on the campaign's characteristics and characteristics of previous campaigns. For example, a model (that is trained based on previous content delivery campaigns) may be used to process the forecasting request.

Thus, a bucket's complexity may be a single value (e.g., 1) or may be a range of values, such as 1-5 (e.g., number of entities returned), 10-50 (e.g., number of entities processed), or greater than 20. The requests that are assigned to the same bucket are similar in that the requests are expected to have roughly the same performance.

At the time of receipt, a request's complexity may not be known. For example, a request may be to view data associated with the submitter's accounts and, at the time of receipt of the request, the number of accounts and content delivery campaigns within each account may not be known. Over time (e.g., after the first of such requests), the number of accounts and content delivery campaigns may be learned and stored so that future requests from the submitter may be handled appropriately.

With respect to performance levels, some buckets are associated with higher expected performance levels than other buckets. Examples of types of performance levels include latency (e.g., in milliseconds), types of errors (e.g., timeouts), numbers of errors, and resource utilization, such as CPU usage, memory usage, and network usage. For example, requests associated with bucket A may be expected to complete under 200 milliseconds while requests associated with bucket B may be expected to complete under 500 milliseconds. As another example, requests associated with bucket C may be expected to have less than 3 errors while requests associated with bucket D may be expected to have less than 5 errors. In a related embodiment, a single bucket may be associated with multiple performance levels, such as a latency threshold and a number of errors threshold.

A bucket may be associated with a particular (e.g., API) endpoint and/or a particular method. An endpoint is an interface exposed by a communicating party or by a communication channel. Endpoints facilitate a standard programmable layer of abstraction whereby heterogeneous software systems and/or subsystems may communicate with each other and the means of communication are decoupled from the communicating subsystems. A method is a sequence of program instructions that perform a specific task and that are packaged as a unit. A method is called or invoked by a calling party. A method call may include one or more parameters. While some methods may have been given the same name, their respective sequence of program instructions may be very different, depending on the endpoint.

The number and types of endpoints vary from one implementation to another. In the context of content delivery campaigns, example endpoints include contentAccounts, contentCampaigns, contentCreatives, contentTargeted, and contentForecasts. Similarly, the number and types of methods may vary from one implementation to another. In the context of content delivery campaigns, example methods include get, batchGet, create, batchUpdate, delete, and findBy Search.

Different endpoints may be associated with (or support) different methods. For example, endpoint contentAccounts may be associated with methods get, batchGet, and create while endpoint contentCampaigns may be associated with methods get and partialUpdate. Each endpoint-method combination corresponds to a different type of request. Each type of request may be associated with a different set of multiple buckets. Thus, some requests of the same type (or endpoint-method combination) may be assigned to one bucket and other requests of that type (or endpoint-method combination) may be assigned to a different bucket.

In an example, if there was only one bucket for each type of request, then aggregating requests of the same type would average out performance data of the requests regardless of the complexity of the requests. Thus, in this example, having a single bucket per request type would either (a) not reveal any problems (e.g., the average performance level is 200 milliseconds and the expected performance level is 600 milliseconds) since the relatively complex requests would be averaged with the relatively simple requests that should not take much time to process or (b) reveal issues when there really are not any issues, just bursty traffic patterns (e.g., when the average performance level exceeds 600 milliseconds due to one or more submitters requesting a lot of data while the vast majority of requests are being processed efficiently).

Example Process

Figure 2A:
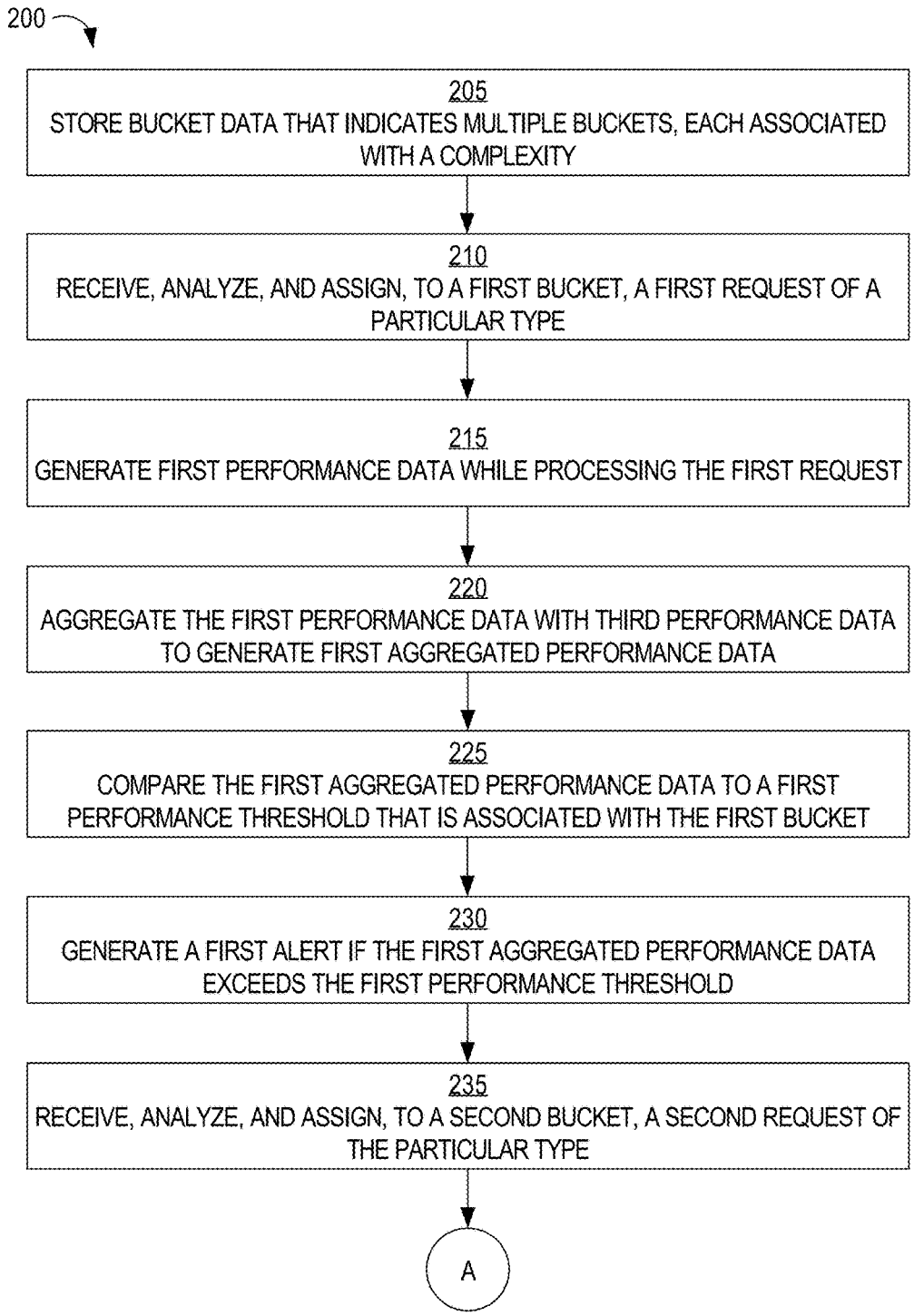
FIGS. 2A-2B are flow diagrams that depict a process for aggregating requests based on complexity, in an embodiment.
Figure 2B:
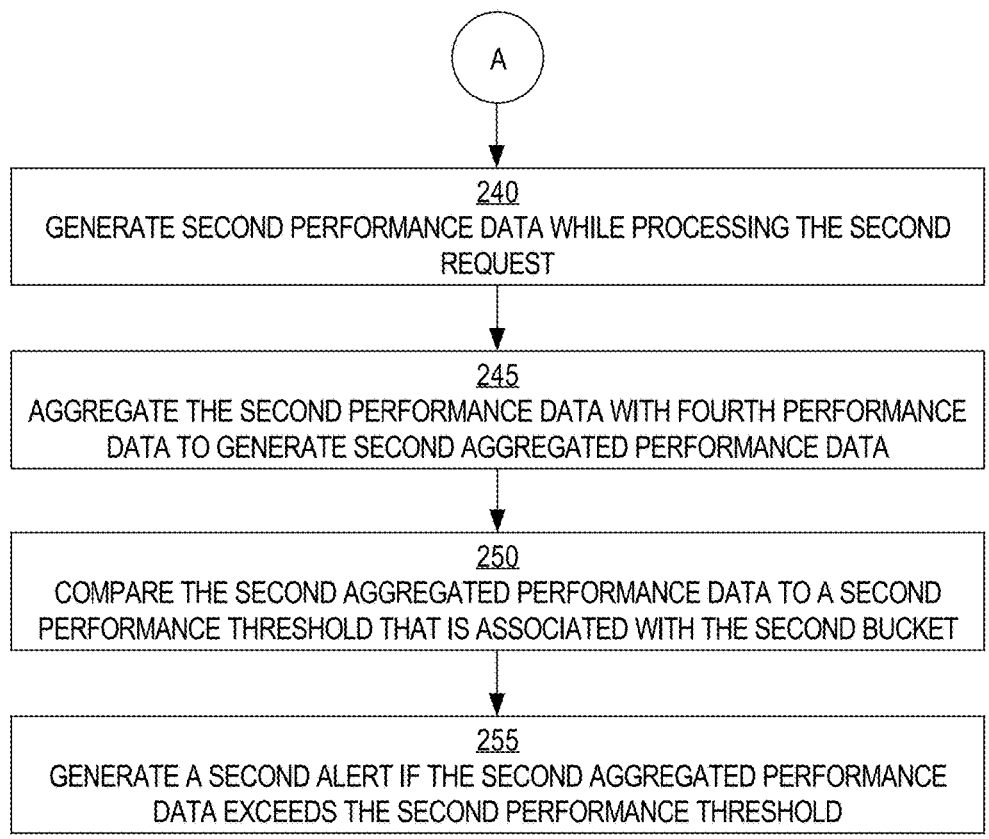

FIG. 2A-2B is are flow diagrams that depict a process 200 for aggregating requests based on complexity, in an embodiment. Process 200 may be implemented by server system 130 or another computer system not depicted.

At block 205, bucket data is stored that indicates multiple buckets. Each bucket is associated with a complexity level or range. Multiple types of requests may be assigned to the same bucket. Additionally or alternatively, each bucket is associated with at most one type of request. However, requests of the same type may be assigned to different buckets.

At block 210, a first request is received, analyzed, and assigned to a first bucket based on a complexity determined for the first request.

Figure 2C:
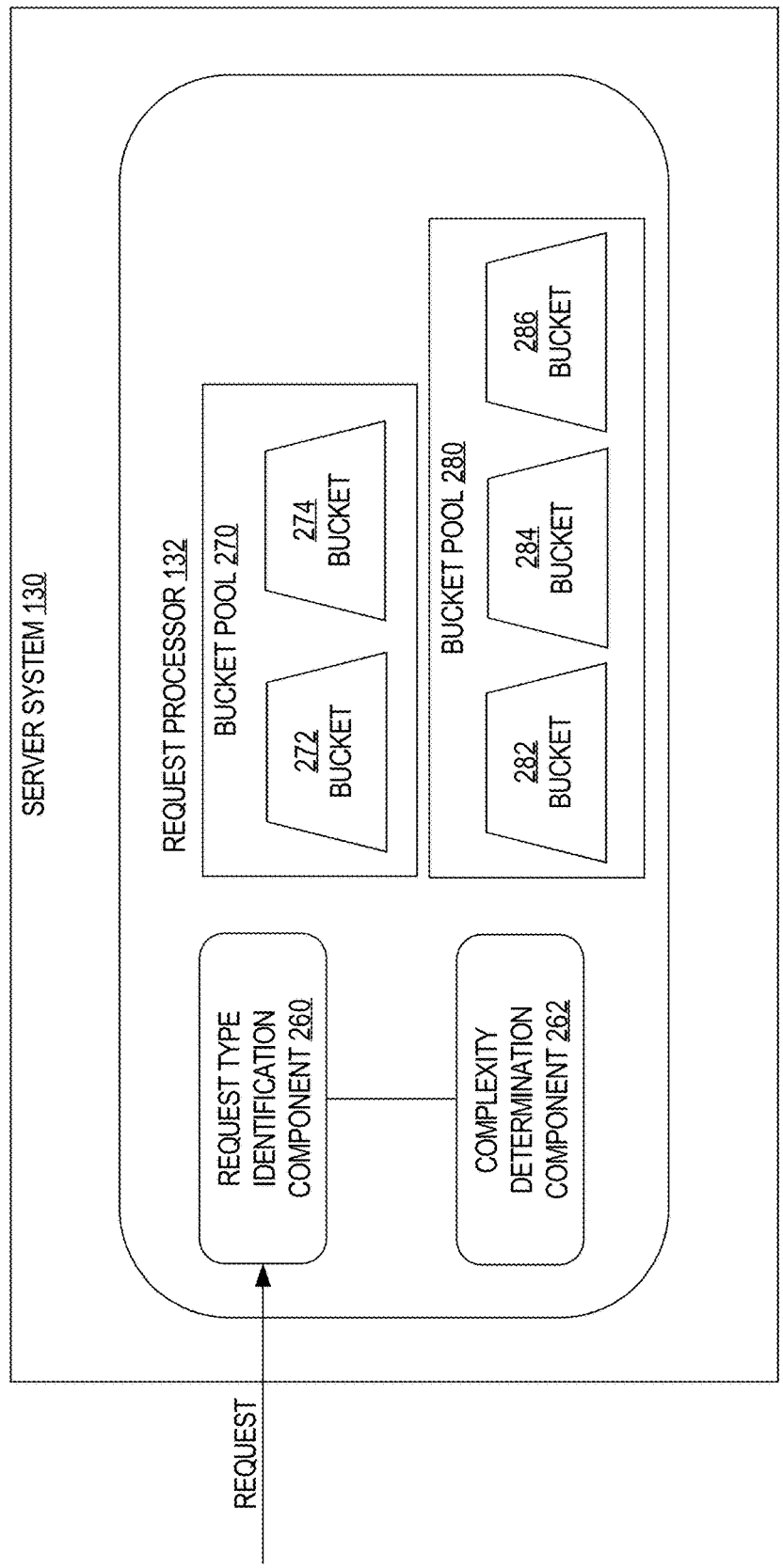
FIG. 2C is a block diagram that depicts components of a request processor, in an embodiment.

FIG. 2C is a block diagram that depicts components of request processor 132, in an embodiment. The request processor 132 receives a request and request type identification component 260 determines a request type for the request. The request processor 132 assigns the request to a particular bucket among the bucket pools 270-280 based on the request type of the request, according to some example embodiments. A particular type of request may be, for example, a unique endpoint-method combination from among multiple unique endpoint-method combinations. While FIG. 2B depicts an example embodiment that includes two bucket pools, indicating two types of requests, other embodiments may include more or less types of requests. Complexity determination component 262 determines a complexity of the request. In various example embodiments, each type of request is associated with a different bucket pool. For instance, if a request is of a first type, then the request will be assigned to one of buckets 272-274, while if a request is of a second type, then the request will be assigned to one of buckets 282-286.

At block 215, first performance data is generated while processing the first request. Examples of performance data include latency of the request, CPU usage required to process the request, memory usage required to process the request, network I/O involved in processing the request, and storage I/O involved in processing the requests.

At block 220, the first performance data is aggregated with third performance data that is already associated with the first bucket. Block 220 involves generating first aggregated performance data that is associated with the first bucket. Example aggregations include average, median, maximum, minimum, and a specific percentile (e.g., 90th percentile).

At block 225, the first aggregated performance data is compared to a first performance threshold that is associated with the first bucket. The first performance threshold indicates an expected performance level while processing requests assigned to the first bucket.

At block 230, an alert is generated if the first aggregated performance data exceeds the first performance threshold.

At block 235, a second request is received, analyzed, and assigned to a second bucket based on a complexity determined for the second request.

At block 240, second performance data is generated while processing the second request.

At block 245, the second performance data is aggregated with fourth performance data that is already associated with the second bucket. Block 245 involves generating second aggregated performance data that is associated with the second bucket. The aggregation performed in block 245 may be the same or different than the aggregation performed in block 220.

At block 250, the second aggregated performance data is compared to a second performance threshold that is associated with the second bucket. The second performance threshold indicates an expected performance level while processing requests that are assigned to the second bucket.

At block 255, an alert is generated if the second aggregated performance data exceeds the second performance threshold.

In a related embodiment, each bucket of one or more buckets is associated with an expected volume of requests (e.g., 20 per hour or 15 during certain 10-minute intervals throughout the day) or an expected range in volume of requests (e.g., between 30 and 95 in any 5-minute window). If the actual volume of requests associated with a bucket exceeds the expected volume (or volume range), then an alert is generated.

Alerts

As described above, an alert may be generated if it is determined that aggregated performance data associated with a bucket exceeds a (e.g., pre-defined) performance level associated with the bucket. An alert may come in many different forms. Examples of how an alert may be delivered or transmitted include a message (e.g., email, text, or IM) directed to one or more recipients (e.g., an administrator of server system 130), an update to a user interface that may be presently displaying on a display of a user's computing device, and an update to an alert file that stores data about alerts.

An alert may include data that identifies an endpoint that is associated with the corresponding bucket, a method that is associated with the corresponding bucket, one or more expected performance levels of the corresponding bucket, one or more actual performance levels of the corresponding bucket, which expected performance level(s) were exceeded, a date and time when the alert was generated, one or more data centers that are/were experience the negative performance issues, one or more computing machines (e.g., servers that reside in the one or more data centers) that are/were experiencing the negative performance issues, a list of one or more client devices that submitted one or more requests that may have caused the negative performance issues, a list of one or more usernames or names of members who submitted the one or more requests that may have caused the negative performance issues, and/or one or more software or device locations where the negative performance issues are detected (e.g., retrieval from storage, a certain portion of the business logic of application code, a particular downstream service that is taking longer than usual).

Some alerts may be more important or critical than other alerts. For example, an alert for a bucket to where a significant portion of the requests are assigned is more important than an alert for a bucket to where relatively few requests are assigned. Request traffic may be such that a vast majority of requests are relatively minor in terms of complexity whereas a few requests are relative complex. Performances issues that affect the vast majority of requests may be critical to address immediately while performance issues that affect the few requests may be less critical. In addition to prioritizing and triaging, another benefit of bucket alerts is that, in order to determine a remedy for poor request processing performance, only requests of a certain "size" need to be examined.

A bucket may be associated with multiple possible alerts, each possible alert associated with a different aggregation type. For example, one alert may be generated if the average performance level exceeds an expected performance level, another alert may be generated if the performance level of the median request exceeds the expected performance level (or another performance level), and another alert may be generated if the performance level of the 90th percentile request exceeds the expected performance level (or another performance level). Each alert may be associated with a different priority level, which may be indicated in the alert itself, whether through text, a color code (e.g., red alerts having a higher priority than green alerts), or graphics.

An alert may also be generated if the change in actual performance of a bucket changes by a certain amount or percentage over a period of time. For example, an alert is generated if the actual (e.g., average) performance of requests associated with a particular bucket doubles in the past week. Such an alert may be independent of the actual performance exceeding an expected performance level.

Throttling Requests

Additionally or alternatively to generating an alert, requests may be throttled or blocked. For example, in response to detecting that a bucket's expected performance level has been exceeded, any subsequent requests that are assigned to the bucket may be blocked, permanently or temporarily. Messages may be sent to the client devices that submit the subsequent requests indicating that the requests will be processed much slower or not all indefinitely or for a period of time, whether specified or unspecified.

In a related embodiment, a bucket is associated with multiple expected performance levels of the same type where, if one expected performance level (e.g., 200 milliseconds) is exceeded, then an alert is generated and if another expected performance level (e.g., 500 milliseconds) is exceeded, then subsequent requests are throttled or blocked.

Predicting a Bucket

There may be some situations where the bucket to which a request will be assigned is not known until the request is at least partially processed. For example, at the time of receiving the request, the number of entities that will be identified and returned in response to the request may not be known. However, there may be one or more buckets whose requests should be blocked or throttled. Without knowing beforehand which bucket a request should be assigned, the request might be processed instead of being blocked.

In an embodiment, in response to receiving a request, a bucket is predicted for the request. In this way, the request is not processed by, for example, retrieving data from persistent storage before a bucket is identified. A bucket is predicted based on one or more criteria associated with the request. Example criteria include one or more attributes of the request, such as the requested endpoint, the requested method, a number of parameters in the request, one or more types of parameters in the request, and one or more parameter values. The criteria may be rule-based. For example, if a request contains more than four parameters, then the request will be assigned to bucket A; otherwise, the request will be assigned to bucket B. As another example, if a request contains two specific types of parameters, then the request will be assigned to bucket C; if the request contains only one of those two types of parameters, then the request will be assigned to bucket D; otherwise the request will be assigned to bucket E.

In an embodiment, a statistical model is generated based on training data of multiple requests. Embodiments are not limited to any particular type of technique for generating the statistical model. Examples include classification, linear regression, and logistic regression. The features of the statistical model include attributes of a request, such as the number of parameters, the types of parameters, values for some of the parameters, and an identity of the user and/or client device that submitted the request. The training data comprises, for each of multiple requests, multiple values for some of these features and to which bucket the request was eventually assigned. Even after a statistical model is deployed, the statistical model may be updated (or a new one trained) for any incorrect predictions that the statistical model makes.

In a related embodiment, multiple statistical models are generated. For example, a first statistical model is generated for a first endpoint and a second statistical model is generated for a second endpoint. As another example, a first statistical model is generated for a first method and a second statistical model is generated for a second method (which may be part of the same endpoint as the first method).

In an embodiment, an accuracy of a statistical model is determined. Such an accuracy may be determined by determining whether each request, of multiple requests, is eventually assigned to the bucket predicted by the statistical model. The accuracy may be reflected by a percentage, where the higher the percentage, the higher the accuracy. The accuracy may change depending on the time window of the requests that are considered. For example, the accuracy of a statistical model may be 50% for week 1 and may be 72% over weeks 1 and 2. Thus, the accuracy of the statistical model over week 2 must be have been higher than 72%.

If an accuracy of a statistical model is below a certain threshold, then an alert may be generated and reported to a user or administrator of server system 130. Additionally or alternatively, the statistical model may be discarded (or deactivated) and a new statistical model may be automatically generated based on a set of training data that is different than the training data upon which the old statistical model was generated. Alternatively, the training data may be the same, but a different machine learning technique is used to generate the new statistical model.

Bucket Size

A bucket "size" refers to the range of a bucket's complexity level and indicates the scope of requests that may be assigned to a bucket. For example, if a bucket is associated with requests that return 1 to 10 entities, then the bucket's size increases if the bucket becomes associated with requests that return 1 to 50 entities.

In an embodiment, a user manually adjusts a bucket's size. Such a manual adjustment could be accomplished using a user interface that allows a user to select a request type (e.g., an endpoint-method combination), select an existing bucket, and modify one or more of the buckets parameters, such as bucket size.

In an embodiment, a bucket's "size" automatically adjusts. An example criterion that may be used to determine whether (and/or how much) to adjust or modify a bucket's size include actual, historical performance levels. For example, if the actual performance levels of multiple "adjacent" buckets (or buckets whose complexity levels are continuous relative to each other) do not exceed their respective expected performance levels (or thresholds) for a certain period of time (e.g., three weeks), then the multiple buckets are merged and the complexity level of the newly formed bucket is adjusted to be equal to the total bucket size of the multiple buckets.

As another example, if a bucket size is 5-20, but a request for five elements takes much less time than a request for twenty elements, then the bucket may be split or the boundaries (or size) of the budget (and one or more adjacent buckets) change.

As another example, if there is the size of a first bucket is 1-5 and the size of a second bucket is 6-20 and it is determined that requests for four or five entities behave more like requests for 6-20 entities than like requests for 1-3 entities, then the size of the first bucket may be changed to 1-3 and the size of the second bucket may be changed to 4-20.

As another example, server system 130 may determine that requests of a first "sub-complexity" of a particular bucket have triggered one or more system performance degradations in the past while requests of a second sub-complexity of the particular bucket have not. For example, the particular bucket's complexity may be returning 1 to 50 entities, the first sub-complexity is returning 20 to 50 entities and the second sub-complexity is returning 1 to 19 entities. In a related example, a particular bucket whose expected performance level is exceeded is split into two or more buckets with different sub-complexities of the particular bucket's complexity. Then, if the expected performance level (which may be the same as the particular bucket's expected performance level) of the "smaller" buckets is exceeded, then that smaller bucket is split. This process of splitting a bucket and then splitting one of the resulting buckets based on performance data may help to isolate which requests are causing the performance problem(s), especially if, in the meantime, the expected performance levels of the other "smaller" bucket(s) are not exceeded. Conversely, the requests that are not causing the performance problem(s) are also identified, which requests are those that are assigned to "smaller" buckets whose expected performance levels are not being exceeded.

As another example, the overall distribution (in terms of complexity and performance) of multiple requests is analyzed. The overall distribution may be visualized on a graph whose x-axis is complexity and whose y-axis is performance, such as latency. Generally, the more complex a request, the worse the performance (e.g., the higher the latency). Based on the analysis, bucket sizes may be adjusted or resized based on points where there are clusters of data, with the range of a bucket being determined statistically, such as using variance or standard deviation.

Dynamic Bucket Creation

In an embodiment, a bucket is dynamically created. For example, in response to receiving a request, a complexity determination is made. One or more buckets associated with the type of request are searched for a bucket that matches (or includes) the complexity. If no bucket that matches the complexity exists, then a new bucket is created and the request (along with its associated performance data) is assigned to that new bucket. For example, if a request's complexity is 15 and the highest complexity bucket goes up only to 10, then the new bucket may be defined as having a complexity of 11-15 or 11-20. If no buckets have yet been created for the type of request, then a bucket is created with a complexity that includes the complexity of 15.

In a related embodiment, instead of automatically creating a new bucket initially, without assigning multiple requests of a particular type to any bucket, request complexity and performance data of each of the requests are analyzed. Statistical analysis may be used to identify clusters of data, with the complexity range of each bucket determined statistically, such as using variance or standard deviation.

Expected Performance Level

In an embodiment, a user manually adjusts a bucket's expected performance level. Such a manual adjustment could be accomplished using a user interface that allows a user to select a request type (e.g., an endpoint-method combination), select an existing bucket, and modify one or more of the bucket's parameters, such as expected performance.

Additionally or alternatively, a bucket's expected performance level dynamically adjusts based on past performance. For example, if the actual (e.g., average) performance level of requests assigned to a particular bucket decreases by 50%, then an expected performance level associated with the particular bucket also decreases by 50%. Instead of percentage changes, the change of an expected performance level may correspond to an absolute amount. For example, if the actual (e.g., median) performance level of requests assigned to a particular bucket decreases by 50 milliseconds, then an expected performance level associated with the particular bucket also decreases by 50 milliseconds.

In a related embodiment, the more consistent a bucket's actual performance level over a period of time, the greater the change in an expected performance level of the bucket. For example, after a week of latency between 90-100 milliseconds, the bucket's expected performance level decreases 50 milliseconds. However, if the latency fluctuates between 70-110 milliseconds, then the bucket's expected performance level may decrease only 25 milliseconds.

Root Cause Identification

In an embodiment, root cause analysis is performed in response to detecting that an expected performance level of a bucket is exceeded. Root cause analysis involves identifying a request, a group of requests that caused a degradation in system performance. Root cause analysis may also involve identifying a client device and/or a user that submitted the request(s).

If the expected performance levels of multiple buckets are exceeded, then one request or set of requests from one of the buckets may be the cause of the degradation. In an embodiment, each time a bucket's expected performance level is exceeded, time data is created that indicates when the expected performance level was exceeded. The time data of different buckets may be used to determine which bucket's expected performance level was exceeded first. The determined bucket is referred to herein as the "trigger bucket."

Regardless of how a trigger bucket is identified, timestamps associated with the requests that are assigned to the trigger bucket are compared to the trigger bucket's time data to determine which request (or set of requests) triggered or caused the degradation in system performance. For example, if a request's timestamp indicates a time that is before the time indicated by the trigger bucket's time data, then the request is not a candidate; otherwise, the request is a candidate. A request may have more than one timestamp, such as when server system 130 receives the request and when server system 130 begins processing the request. Either or both timestamps may be used to determine which request (or set of requests) caused the degradation.

Once a set of one or more requests (referred to herein as "trigger requests") are identified, a submitter (or client device) of each trigger request may be identified. Server system 130 may (immediately) send a message to the submitter or to the client device indicating that requests from the submitter will be blocked or throttled. Such a message may be sent in response to receiving a request from the submitter or client device.

Identifying individual submitters may be useful in situations where server system 130 has a small number of external partners who act as consolidators for relatively small content providers (e.g., advertisers). Such partners may impose a greater load on the system than the average content provider that directly uses server system 130 because such partners may be submitting requests for tens or hundreds of accounts, where each account may be associated with many content delivery campaigns. Because the number of partners may be small, each partner is individually tracked to find out the number of queries (e.g., per second) that they are sending against each end-point. This allows server system 130 to detect when a partner is overloading the system (e.g., requesting a large number of summary-reports that are computationally expensive to generate). This detection is particularly useful since traffic from external partners can be extremely bursty in nature. Adding individual monitoring also allows server system 130 to (1) detect when a partner is overloading the system to identify where throttling should be implemented and (2) alert partners to spread out their respective workloads.

Aggregating by Type

In an embodiment, instead of creating and maintaining multiples buckets for each type of request (e.g., each unique endpoint-method combination), each type of request is associated with a single bucket. Thus, each type of request is associated with one or more expected levels of performance. Also, performance data of multiple requests of the same type are aggregated and compared to one of the expected performance levels associated with the request type. In this embodiment, there is no notion of different complexities for the same type of request.

Example User Interface

Figure 3:
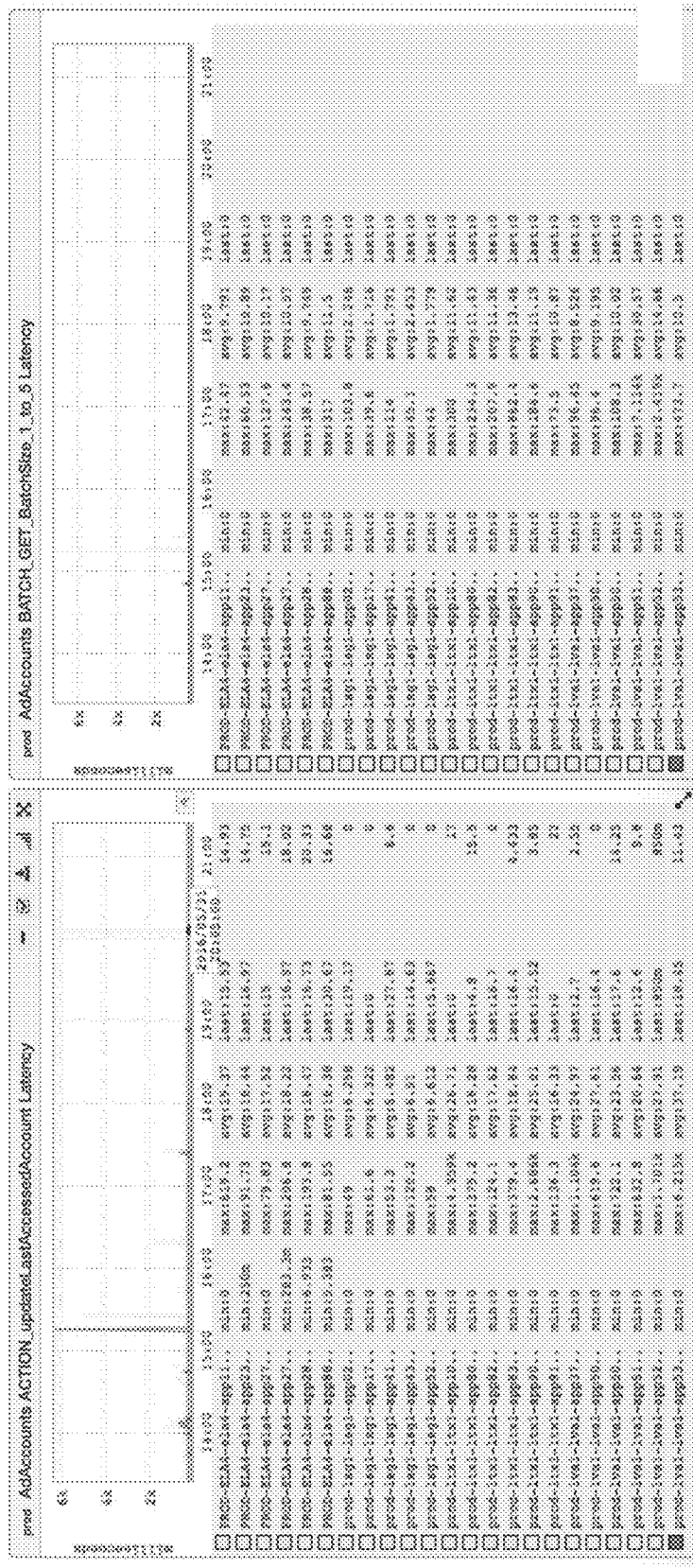
FIG. 3 is a diagram that depicts an example user interface that displays statistics on performance of different types of requests across different data centers and devices or applications within the data centers, in an embodiment.

FIG. 3 is a diagram that depicts an example user interface that displays statistics on performance of different types of requests across different data centers and devices within the data centers, in an embodiment. Although not depicted, embodiments involve displaying statistics on performance of different types of requests across different services. Chart 310 indicates latency of one type of request and chart 320 indicates latency of another type of request. As chart 310 and 320 indicate, each type of request has the same endpoint ("AdAccounts") but different methods being invoked.

Each row in tables 312 and 322 below charts 310 and 320 correspond to a different device. Multiple rows belong to the same data center. Four data centers in all are indicated in tables 312 and 322.

Due to user selection of the last device listed in one of the two tables of information, each chart shows latency of the last device. Chart 310 indicates that latency spiked to around 6,000 milliseconds some time after 15:00 and before 16:00.

Table 312 shows minimum, maximum, average, and last data for each device based on user input relative to chart 310 and relative to a point in time, which is 20:05 in this example. The information in table 312 changes as the location of the user input changes relative to the time axis in chart 310. For example, at time 20:05, for the second device, the minimum latency is 250 microseconds, the maximum latency is 91.73 milliseconds, the average latency is 18.44 milliseconds, the latency of the last request processed by the device is 16.97 milliseconds, and the latency of a request that is being processed at time 20:05 is 14.75 milliseconds.

If the last device in one of the two tables is de-selected, then charts 310 and 320 may be updated to reflect the latency of each device listed in the two tables. Latency information reflected in chart 310 may include a different color for each device.

While the graphs in FIG. 3 are generated by a single application, in a related embodiment, the underlying data graphs may be further broken down by application. Such an embodiment may be helpful if two or more applications produce nearly identical queries. Generally, however, different applications are independent enough that grouping their respective metrics into a single graph is unlikely to be useful.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
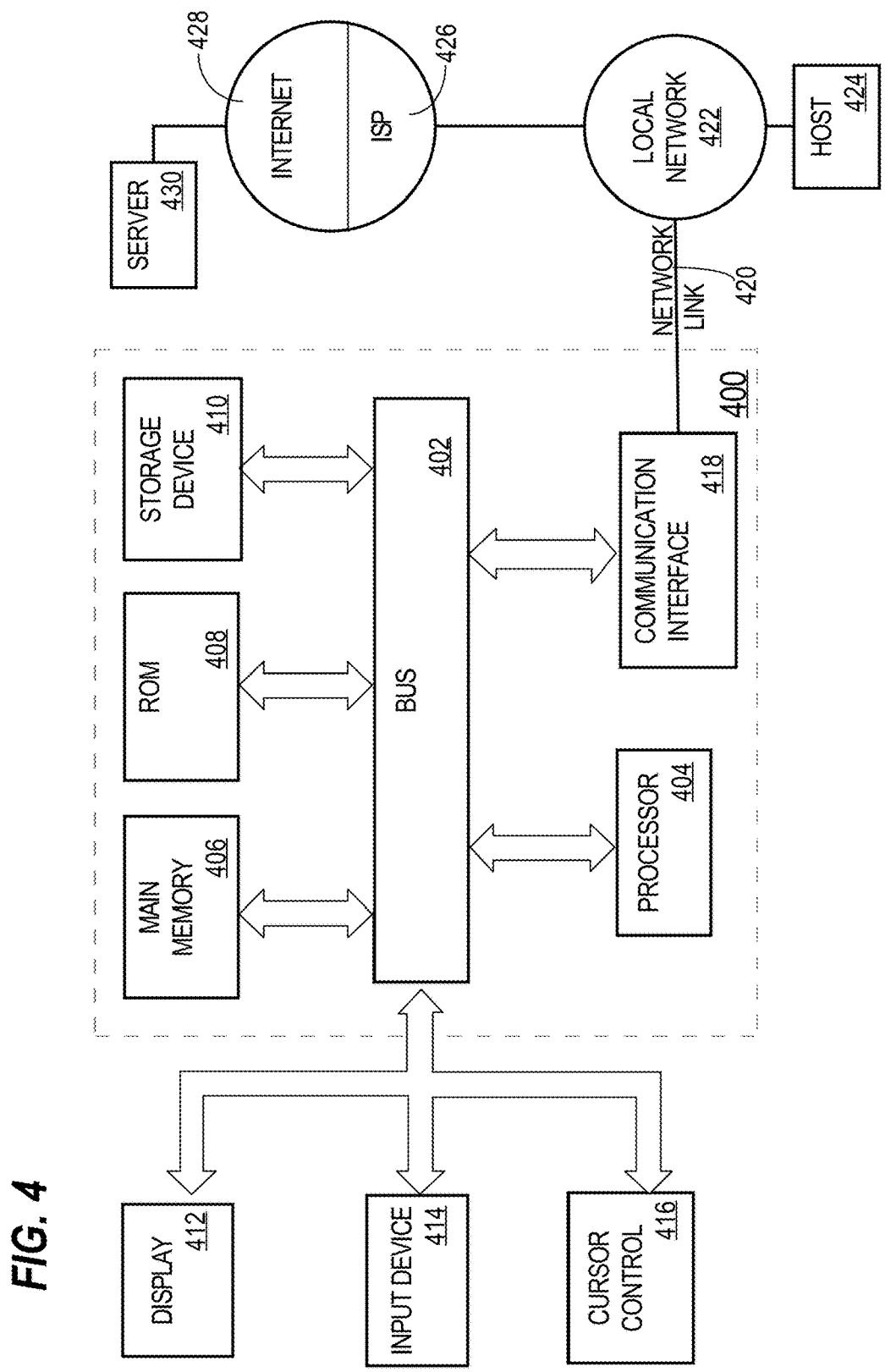
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
   one or more processors;
   one or more storage media storing instructions which, when executed by the one or more processors, cause:
      storing bucket data that indicates a plurality of buckets that are associated with a particular type of request in a plurality of types of requests from third-party entities;
      after storing the bucket data, receiving, from a plurality of third-party entities, a plurality of inbound requests that includes a first inbound request that indicates the particular type of request and a second inbound request that indicates the particular type of request;
      determining, based on the bucket data, to assign the first inbound request to a first bucket of the plurality of buckets;
      generating first performance data while processing the first inbound request;

aggregating the first performance data with third performance data that was generated while processing one or more third inbound requests that are assigned to the first bucket;
determining, based on the bucket data, to assign the second inbound request to a second bucket, of the plurality of buckets, that is different than the first bucket;
while processing the second inbound request, generating second performance data that indicates one or more performance metrics of processing the second inbound request;
aggregating the second performance data with fourth performance data that was generated by processing one or more fourth requests that are assigned to the second bucket;
storing first threshold data in association with the first bucket;
wherein aggregating the first performance data with the third performance data comprises generating first combined performance data based on the first performance data and the third performance data;
comparing the first combined performance data with the first threshold data.

2. The system of claim 1, wherein the first performance data indicates one or more of a time to process the first inbound request, a number of errors that were detected in processing the first inbound request, one or more types of errors that were detected in processing the first inbound request, or volume of requests.

3. The system of claim 1, wherein the first bucket is associated with a first complexity and the second bucket is associated with a second complexity that is greater than the first complexity.

4. The system of claim 3, wherein the first complexity indicates a first number of items and the second complexity indicates a second number of items that is greater than the first number of items.

5. The system of claim 1, wherein the instructions, when executed by the one or more processors, further cause:
generating an alert in response to determining that the first combined performance data is greater than the first threshold data;
causing the alert to be transmitted for display on a user interface of a computing device.

6. The system of claim 5, wherein the instructions, when executed by the one or more processors, further cause:
automatically adjusting the first threshold data based on current conditions associated with a server system and previous conditions associated with the server system.

7. The system of claim 1, wherein the instructions, when executed by the one or more processors, further cause:
after aggregating the first performance data with the third performance data, receiving a third request;
wherein aggregating the first performance data with the third performance data comprises generating first combined performance data based on the first performance data and the third performance data;
in response to receiving the third request:
determining that the third request is associated with the first bucket,
based on the first combined performance data, determining to not process the third request.

8. The system of claim 1, wherein the instructions, when executed by the one or more processors, further cause:
storing a statistical model that takes, as input, multiple request attributes that are associated with a request and that produces, as output, a value that is used to identify a bucket from among the plurality of buckets;
in response to receiving the first inbound request:
identifying a plurality of request attributes that are associated with the first inbound request,
generating, based on the statistical model and the plurality of request attributes, a first value,
wherein determining to assign the first inbound request to the first bucket is based on the first value.

9. The system of claim 8, wherein the instructions, when executed by the one or more processors, further cause:
generating a second value while processing the first inbound request;
determining a difference between the second value and the first value;
determining an accuracy of the statistical model based on the difference between the second value and the first value.

10. The system of claim 1, wherein the instructions, when executed by the one or more processors, further cause:
determining that performance data associated with the first bucket exceeds a particular threshold, wherein the performance data is associated with a particular time;
in response to determining that the performance data associated with the first bucket exceeds the particular threshold:
identifying a particular request that preceded the particular time,
identifying a user that initiated the particular request,
performing a particular action that is related to the user.

11. The system of claim 1, wherein each type of request of the plurality of types of requests corresponds to a different endpoint-method combination.

12. A method comprising:
storing bucket data that indicates a plurality of buckets that are associated with a particular type of request in a plurality of types of requests from third-party entities;
after storing the bucket data, receiving, from a plurality of third-party entities, a plurality of inbound requests that includes a first inbound request that indicates the particular type of request and a second inbound request that indicates the particular type of request;
determining, based on the bucket data, to assign the first inbound request to a first bucket of the plurality of buckets;
generating first performance data while processing the first inbound request;
aggregating the first performance data with third performance data that was generated while processing one or more third inbound requests that are assigned to the first bucket;
determining, based on the bucket data, to assign the second inbound request to a second bucket, of the plurality of buckets, that is different than the first bucket;
while processing the second inbound request, generating second performance data that indicates one or more performance metrics of processing the second inbound request;
aggregating the second performance data with fourth performance data that was generated by processing one or more fourth requests that are assigned to the second bucket;
storing first threshold data in association with the first bucket;
wherein aggregating the first performance data with the third performance data comprises generating first combined performance data based on the first performance data and the third performance data;

comparing the first combined performance data with the first threshold data.

13. The method of claim 12, wherein the first performance data indicates one or more of a time to process the first inbound request, a number of errors that were detected in processing the first inbound request, one or more types of errors that were detected in processing the first inbound request, or volume of requests.

14. The method of claim 12, wherein the first bucket is associated with a first complexity and the second bucket is associated with a second complexity that is greater than the first complexity.

15. The method of claim 14, wherein the first complexity indicates a first number of items and the second complexity indicates a second number of items that is greater than the first number of items.

16. The method of claim 12, further comprising:

generating an alert in response to determining that the first combined performance data is greater than the first threshold data;

causing the alert to be transmitted for display on a user interface of a computing device.

17. The method of claim 16, further comprising:

automatically adjusting the first threshold data based on current conditions associated with a server system and previous conditions associated with the server system.

18. The method of claim 12, further comprising:

after aggregating the first performance data with the third performance data, receiving a third request;

wherein aggregating the first performance data with the third performance data comprises generating first combined performance data based on the first performance data and the third performance data;

in response to receiving the third request:

determining that the third request is associated with the first bucket, based on the first combined performance data, determining to not process the third request.

* * * * *